(12) United States Patent
Maezawa et al.

(10) Patent No.: US 11,557,269 B2
(45) Date of Patent: Jan. 17, 2023

(54) INFORMATION PROCESSING METHOD

(71) Applicant: YAMAHA CORPORATION, Hamamatsu (JP)

(72) Inventors: Akira Maezawa, Hamamatsu (JP); Boehen Li, Rochester, NY (US)

(73) Assignee: YAMAHA CORPORATION, Hamamatsu (JP)

( * ) Notice: Subject to any disclaimer, the term of this patent is extended or adjusted under 35 U.S.C. 154(b) by 188 days.

(21) Appl. No.: 16/983,341

(22) Filed: Aug. 3, 2020

(65) Prior Publication Data
US 2020/0365126 A1 Nov. 19, 2020

Related U.S. Application Data

(63) Continuation of application No. PCT/JP2019/004115, filed on Feb. 5, 2019.

(30) Foreign Application Priority Data

Feb. 6, 2018 (JP) .............................. JP2018-019141

(51) Int. Cl.
*G10H 1/00* (2006.01)
*G10H 1/02* (2006.01)
*G06N 3/08* (2006.01)

(52) U.S. Cl.
CPC ............. *G10H 1/0008* (2013.01); *G06N 3/08* (2013.01); *G10H 1/02* (2013.01); *G10H 2220/056* (2013.01)

(58) Field of Classification Search
CPC .. G10H 1/0008; G10H 1/02; G10H 2220/056; G06N 3/08

USPC .......................................................... 84/609
See application file for complete search history.

(56) References Cited

U.S. PATENT DOCUMENTS

| | | | | |
|---|---|---|---|---|
| 5,581,618 A | * | 12/1996 | Satoshi | G10H 1/0091 381/17 |
| 6,898,759 B1 | * | 5/2005 | Terada | G10H 1/368 345/473 |
| 8,706,274 B2 | * | 4/2014 | Kobayashi | A63F 13/00 700/94 |

(Continued)

FOREIGN PATENT DOCUMENTS

| | | |
|---|---|---|
| JP | H08195070 A | 7/1996 |
| JP | H08195070 A * | 7/1996 |

(Continued)

OTHER PUBLICATIONS

Yamamoto. "Generating CG Animation of Natural Hand Motion in Playing a Piano." The Virtual Reality Society of Japan. 2020: 495-502. vol. 15, No. 3. English abstract provided. Cited in Specification.

(Continued)

*Primary Examiner* — Christina M Schreiber
(74) *Attorney, Agent, or Firm* — Rossi, Kimms & McDowell LLP

(57) ABSTRACT

An information processing device 11 including: a control data generation unit that inputs analysis data X that is to be processed, to a trained model that has learnt a relationship between analysis data X that represents a time series of musical notes, and control data Y for controlling movements of an object that represents a performer, thereby generating control data Y according to the analysis data X.

9 Claims, 4 Drawing Sheets

(56) References Cited

U.S. PATENT DOCUMENTS

| | | | |
|---|---|---|---|
| 9,478,200 B2 * | 10/2016 | Maezawa | G10H 1/0066 |
| 10,643,593 B1 * | 5/2020 | Kolen | G10H 1/40 |
| 2004/0013295 A1 * | 1/2004 | Sabe | G06V 20/10 |
| | | | 382/153 |
| 2009/0100988 A1 * | 4/2009 | Villa | G10H 1/368 |
| | | | 84/601 |
| 2013/0192445 A1 * | 8/2013 | Sumi | G10H 1/0008 |
| | | | 84/609 |
| 2016/0104469 A1 * | 4/2016 | Takahashi | G09B 15/00 |
| | | | 84/609 |
| 2018/0102119 A1 * | 4/2018 | Yamamoto | G10H 1/0033 |
| 2019/0043239 A1 * | 2/2019 | Goel | G10L 19/00 |
| 2019/0156807 A1 * | 5/2019 | Ryynanen | G10H 1/0025 |
| 2019/0237055 A1 * | 8/2019 | Maezawa | G10G 3/04 |
| 2020/0365123 A1 * | 11/2020 | Maezawa | G06T 13/205 |
| 2020/0365126 A1 * | 11/2020 | Maezawa | G10H 1/368 |
| 2021/0151014 A1 * | 5/2021 | Maezawa | G06N 3/0472 |

FOREIGN PATENT DOCUMENTS

| | | | | | |
|---|---|---|---|---|---|
| JP | 2000010560 A | * | 1/2000 | | |
| JP | 2000010560 A | | 1/2000 | | |
| JP | 2002086378 A | * | 3/2002 | | |
| JP | 2002086378 A | | 3/2002 | | |
| JP | 2010134790 A | * | 6/2010 | | A63F 13/00 |
| JP | 2010134790 A | | 6/2010 | | |
| JP | 2013047938 A | * | 3/2013 | | G06F 17/30743 |
| JP | 2013047938 A | | 3/2013 | | |
| JP | 2015079183 A | * | 4/2015 | | |
| JP | 2015081985 A | | 4/2015 | | |
| JP | 2015081985 A | * | 4/2015 | | |
| JP | 2015138160 A | * | 7/2015 | | |
| JP | 2016041142 A | * | 3/2016 | | |
| JP | 2016041142 A | | 3/2016 | | |

OTHER PUBLICATIONS

Kugimoto. "Computer animation for piano fingering using motion capture and its application to a music interface." Information Processing Society of Japan, SIG Technical Report. Oct. 12, 2007: 79-84. 2007-MUS-72(15). English abstract provided. Cited in Specification.

International Search Report issued in Intl. Appln. No PCT/JP2019/004115 dated Mar. 19, 2019. English translation provided.

Written Opinion issued in Intl Appln. No. PCT/JP2019/004115 dated Mar. 19, 2019.

Goto "A Virtual Jazz Session System: VirJa Session " Transactions of Information Processing Society of Japan. Apr. 1999: 1910-1921. vol. 40, No. 4. English abstract provided. Cited in NPL 3 and NPL 4.

Aotani. "Learning to control mobile manipulator using Deep Reinforcement Learning." Proceedings of the 2016 JSME Conference on Robotics and Mechatronics. Jun. 8-11, 2016.1P1-04b4(1)-1P1-04b4(2). English abstract provided. Cited in NPL 3 and NPL 4.

Hamanaka. "A virtual player imitating musician's personality." IPSJ Magazine. Apr. 15, 2006: 374-380. vol. 47, No. 4. Cited in NPL 3 and NPL 4.

* cited by examiner

INFORMATION PROCESSING METHOD

TECHNICAL FIELD

The present invention relates to an information processing method, an information processing device, and an information processing program for controlling movements of an object that represents a performer such as a player.

BACKGROUND ART

Conventionally, techniques for controlling movements of an object, which is an image representing a player, according to song performance data, have been proposed (Patent Literatures 1 and 2 and Non-patent Literatures 1 and 2). For example, Patent Literature 1 discloses a technique for generating a moving image of a player playing a song, according to a pitch that is specified by performance data.

CITATION LIST

Patent Literatures

Patent Literature 1: JP 2000-10560A
Patent Literature 2: JP 2010-134790A

Non-Patent Literatures

Non-patent Literature 1: Kazuki YAMAMOTO and five other authors, "Generating CG Animation of Natural Hand Motion in Playing a Piano", TVRSJ Vol. 15 No. 3 p. 495-502, 2010
Non-patent Literature 2: Nozomi KUGIMOTO and five other authors, "Computer animation for piano fingering using motion capture and its application to a music interface", Information Processing Society of Japan, study report, 2007-MUS-72(15), 2007/10/12.

SUMMARY OF INVENTION

Technical Problem

According to the technique disclosed in Patent Literature 1, performance movement data that indicates movements of an object respectively corresponding to conditions such as the pitch and volume of each note is stored in a storage device. Pieces of performance movement data corresponding to the respective conditions of the notes specified by song performance data are retrieved from the storage device, and are used to control the movements of the object. However, with a configuration in which performance data and performance movement data are statically associated with each other, there is the problem in that the movements of the object corresponding to performance data are likely to be monotonous and stereotyped. Considering the above situation, the present invention aims to generate control data that is used to variously change the movements of an object according to performance.

Solution to Problem

To solve the above-described problem, an information processing method according to a preferred aspect of the present invention includes: a step of acquiring analysis data that represents a time series of musical notes; and a step of generating control data corresponding to the analysis data by inputting analysis data that is to be processed, to a trained model that has learnt a relationship between the analysis data and control data for controlling movements of a virtual object that represents a performer.

An information processing apparatus according to a preferred aspect of the present invention includes a control data generation unit that inputs analysis data that is to be processed, to a trained model that has learnt a relationship between analysis data that represents a time series of musical notes, and control data for controlling movements of a virtual object that represents a performer, thereby generating control data according to the analysis data.

An information processing program according to a preferred aspect of the present invention causes a computer to carry out: a step of acquiring analysis data that represents a time series of musical notes; and a step of generating control data corresponding to the analysis data by inputting analysis data that is to be processed, to a trained model that has learnt a relationship between the analysis data and control data for controlling movements of a virtual object that represents a performer.

DESCRIPTION OF EMBODIMENTS

The following describes a performance system according to an embodiment of the present invention.

1. Overview of Performance System

Figure 1:
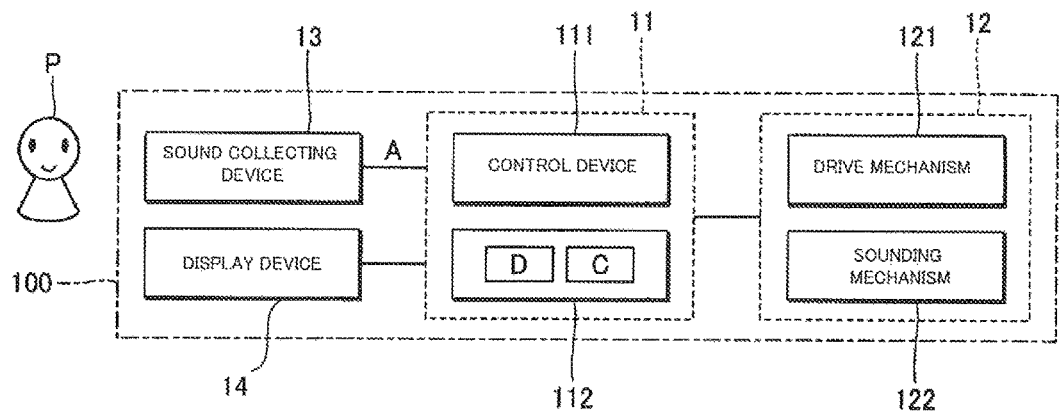
FIG. 1 is a block diagram illustrating a configuration of a performance system according to an embodiment of the present invention.

FIG. 1 is a block diagram illustrating a configuration of a performance system 100 according to a preferred embodiment of the present invention. The performance system 100 is a computer system that is installed in a space such as a concert hall in which a player P is present. The player P is a person who plays a musical instrument, or a person who sings a song. When the player P plays a song, the performance system 100 automatically plays the song that the player is playing.

2. Hardware Configuration of Performance System

As illustrated in FIG. 1, the performance system 100 includes an information processing device 11, a performance device 12, a sound collecting device 13, and a display device 14. The information processing device 11 is a computer system that controls the elements of the performance system 100, and is realized using an information terminal such as a tablet terminal or a personal computer.

The performance device 12 automatically plays a song under the control of the information processing device 11. Specifically, the performance device 12 is a self-playing musical instrument that includes a drive mechanism 121 and a sounding mechanism 122. For example, if the self-playing musical instrument is a player piano, the performance device 12 includes a keyboard and strings (sounding members) corresponding to the keys of the keyboard. As in keyboard instruments that are natural musical instruments, the sounding mechanism 122 includes, for each key of the keyboard, a string striking mechanism that causes a string to produce a sound in conjunction with displacement of the key. The drive mechanism 121 drives the sounding mechanism 122, and thus a target song is automatically played. The drive mechanism 121 drives the sounding mechanism 122 according to an instruction from the information processing device 11, and thus a song is automatically played. Note that the information processing device 11 may be installed to the performance device 12.

The sound collecting device 13 is a microphone that collects sounds (e.g. instrument sounds or vocal sounds) produced through performance by the player P. The sound collecting device 13 generates an acoustic signal A that expresses an acoustic waveform. Note that an acoustic signal A output from an electric musical instrument such as an electric string instrument may be used. Therefore, the sound collecting device 13 may be omitted. The display device 14 displays various images under the control of the information processing device 11. For example, various displays such as a liquid crystal panel and a projector may be desirably used as the display device 14.

As illustrated in FIG. 1, the information processing device 11 is realized using a computer system that includes a control device 111 and a storage device 112. The control device 111 is a processing circuit that includes, for example, a CPU (Central Processing Unit), a RAM, a ROM, and so on, and controls the elements (the performance device 12, the sound collecting device 13, the display device 14) that constitute the performance system 100, in a centralized manner. The control device 111 includes at least one circuit.

The storage device (memory) 112 is constituted by a well-known recording medium such as a magnetic recording medium (a hard disk drive) or a semiconductor recording medium (a solid state drive), or a combination of several kinds of recording media, and stores programs that are to be executed by the control device 111, and various kinds of data that are to be used by the control device 111. Note that a storage device 112 (e.g. a cloud storage) separated from the performance system 100 may be provided, and the control device 111 may perform writing and reading to and from the storage device 112 via a communication network such as a mobile communication network or the Internet, for example. That is to say, the storage device 112 may be omitted from the performance system 100.

The storage device 112 according to the present embodiment stores song data D. Song data D is a file (SMF: Standard MIDI File) in the format that conforms to the MIDI (Musical Instrument Digital Interface) standard, for example. Song data D specifies the time series of the notes that constitutes a song. Specifically, song data D is time-series data in which performance data E and time data are arranged, where performance data E specifies notes to make an instruction to play a song, and time data specifies points in time at which pieces of performance data E are to be respectively read out. Performance data E specifies the pitch and strength of each note, for example. Time data specifies, for example, the interval between points in time at which pieces of performance data E, one being subsequent to the other, are to be respectively read out.

3. Software Configuration of Performance System

Figure 2:
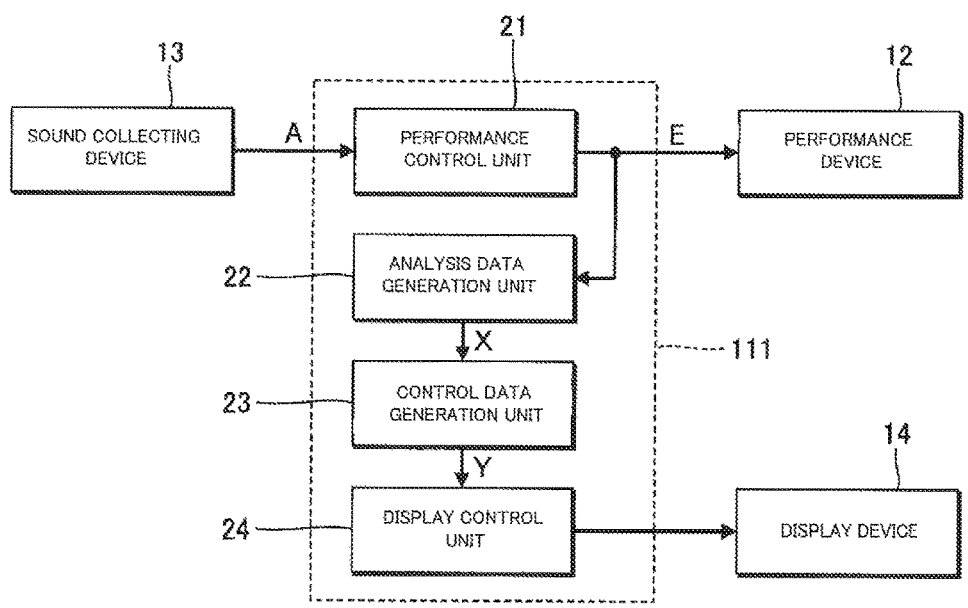
FIG. 2 is a block diagram illustrating a functional configuration of an information processing device.

Next, a software configuration of the information processing device 11 will be described. FIG. 2 is a block diagram illustrating a functional configuration of the information processing device 11. As illustrated in FIG. 2, the control device 111 executes a plurality of tasks according to the programs stored in the storage device 112, thereby realizing the plurality of functions illustrated in FIG. 2 (a performance control unit 21, an analysis data generation unit 22, a control data generation unit 23, and a display control unit 24). Note that the functions of the control device 111 may be realized using a set of a plurality of devices (i.e. a system), and at least one or all of the functions of the control device 111 may be realized using a dedicated electronic circuit (e.g. a signal processing circuit). Also, at least one or all of the functions of the control device 111 may be realized by a server device that is located away from the space such as the concert hall in which the performance device 12, the sound collecting device 13, and the display device 14 are installed.

3-1. Performance Control Unit

The performance control unit 21 is a sequencer that sequentially outputs pieces of performance data E included in song data D to the performance device 12. The performance device 12 plays notes that are specified by the pieces of performance data E that are sequentially supplied from the performance control unit 21. The performance control unit 21 according to the present embodiment variably controls the timing of outputting each piece of performance data E to the performance device 12 so that the automatic performance by the performance device 12 accompanies the actual performance by the player P. The player P's timing of playing each note of a song dynamically changes depending on musical expressions or the like that are intended by the player P. Therefore, the performance control unit 21's timing of outputting each piece of performance data E to the performance device 12 is also variable.

Specifically, the performance control unit 21 estimates the player P's actual timing of playing each note of a song (hereinafter referred to as "play timing") by analyzing the acoustic signal A. The estimation of play timing is sequentially performed simultaneously with the actual performance by the player P. Any known acoustic analysis technology such as JP 2015-79183A (score alignment) may be employed to realize the estimation of play timing. The performance control unit 21 outputs pieces of performance data E to the performance device 12 such that automatic performance by the performance device 12 is synchronized with a play timing progression. Specifically, each time the play timing specified by a piece of time data included in song data D is reached, the performance control unit 21 outputs a piece of performance data E corresponding to the piece of time data to the performance device 12. Therefore, the progression of automatic performance by the performance device 12 is synchronized with the actual performance by the player P. That is to say, an ambience in which as if the performance device 12 and the player P play an ensemble in coordination with each other is created.

3-2. Display Control Unit

Figure 3:
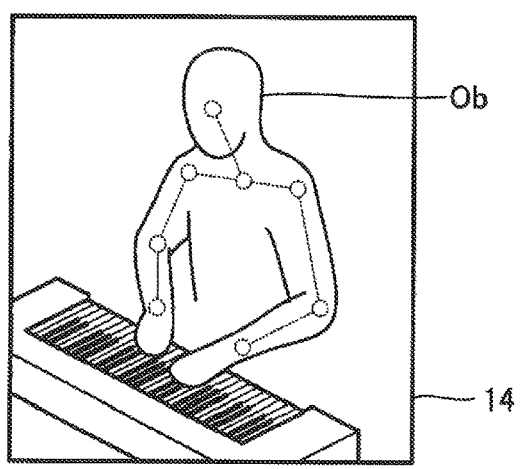
FIG. 3 is a diagram illustrating a screen displayed by a display device.

As illustrated in FIG. 3, the display control unit 24 displays an image that represents a virtual player (hereinafter referred to as an "player object (virtual object)" Ob on the display device 14. An image that represents a keyboard instrument played by the player object Ob is also displayed on the display device 14 together with the player object Ob. The player object Ob illustrated in FIG. 3 is an image that represents the upper body of the player including their arms, chest, and head. The display control unit 24 dynamically changes the player object Ob during the automatic performance by the performance device 12. Specifically, the display control unit 24 controls the player object Ob such that the player object Ob performs performance movements in synchronization with the automatic performance by the performance device 12. For example, the player object Ob swings the body thereof according to the rhythm of automatic performance, and the player object Ob performs key pressing movements when notes are caused to sound through automatic performance. Therefore, a user (e.g. the player P or an audience) who visually checks the image displayed on the display device 14 can feel as if the player object Ob is playing a song. The analysis data generation unit 22 and the control data generation unit 23 in FIG. 2 are elements for synchronizing the movements of the player object Ob with automatic performance.

3-3. Analysis Data Generation Unit

The analysis data generation unit 22 generates analysis data X that represents the time series of notes that are to be automatically played. The analysis data generation unit 22 sequentially acquires pieces of performance data E output from the performance control unit 21, and generates analysis data X based on the time series of the pieces of performance data E. While acquiring the piece of performance data E output from the performance control unit 21, the analysis data generation unit 22 sequentially generates pieces of analysis data X for a plurality of unit periods (frames) on the time axis, respectively. That is to say, pieces of analysis data X are sequentially generated while actual performance by the player P and automatic performance by the performance device 12 are performed.

Figure 4:
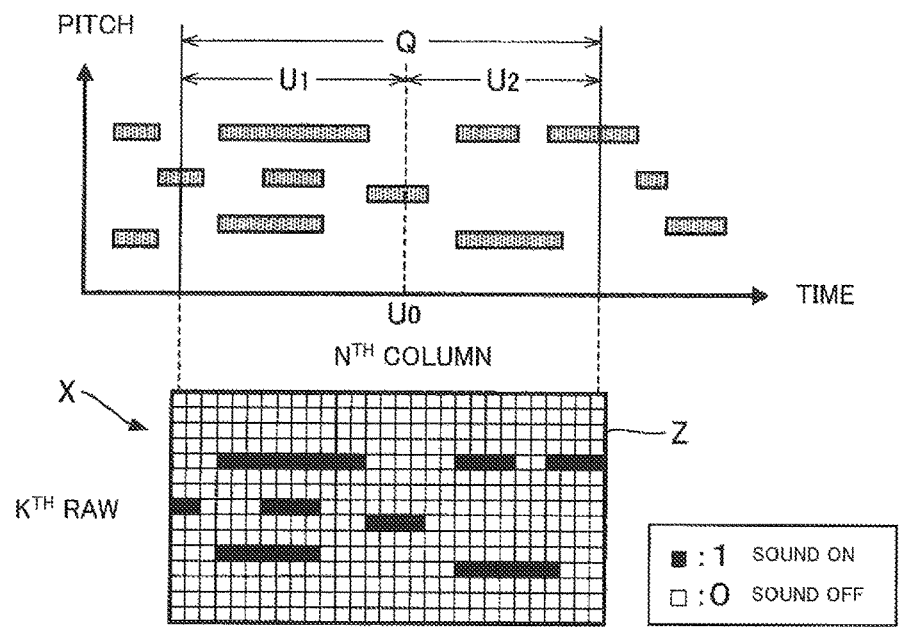
FIG. 4 is a diagram illustrating analysis data.

FIG. 4 is a diagram illustrating the analysis data X. The analysis data X according to present embodiment includes a matrix (hereinafter, referred to as a "performance matrix") Z of K rows and N columns (K and N are natural numbers). The performance matrix Z is a binary matrix that represents the time series of the pieces of performance data E sequentially output from the performance control unit 21. The horizontal direction of the performance matrix Z corresponds to a time axis. Each column of the performance matrix Z corresponds to a unit period of N (e.g. 60) unit periods. The vertical direction of the performance matrix Z corresponds to a pitch axis. Each row of the performance matrix Z corresponds to a pitch of K (e.g. 128) pitches. An element of the performance matrix Z at the $k^{th}$ row and the $n^{th}$ column (k=1 to K and n=1 to N) represents whether or not a note is to be caused to sound at the pitch corresponding to the $k^{th}$ row in the unit period corresponding to the $n^{th}$ column. Specifically, an element that is to sound at the pitch is set to "1", and an element that is not to sound at the pitch is set to "0".

As illustrated in FIG. 4, a piece of analysis data X generated for one unit period on the time axis (hereinafter referred to as a "specific unit period", which also corresponds to a "predetermined time" according to the present invention) U0 indicates the time series of the notes in an analysis period Q that includes the specific unit period U0. Each of a plurality of unit periods on the time axis is sequentially selected as a specific unit period U0 in time series order. The analysis period Q is a period constituted by N unit periods that include the specific unit period U0. That is to say, the $n^{th}$ column of the performance matrix Z corresponds to the $n^{th}$ unit period of N unit periods that constitute the analysis period Q. Specifically, the analysis period Q is constituted by one specific unit period U0 (present), a period U1 (a first period) that is forward (past) of the specific unit period U0, and a period U2 (a second period) that is rearward (future) of the specific unit period U0. The period U1 and the period U2 are each a period of approximately one second that is constituted by a plurality of unit periods.

The elements of the performance matrix Z corresponding to the unit periods included in the period U1 are each set to "1" or "0" according to the pieces of performance data E that have been acquired from the performance control unit 21. On the other hand, the elements of the performance matrix Z corresponding to the unit periods included in the period U2 (i.e. the elements corresponding to periods in the future for which pieces of performance data E have not been acquired) are predicted based on the time series of the notes precedent to the specific unit period U0, and the song data D. In order to predict the elements corresponding to the unit periods in the period U2, any well-known time-series analysis technique (for example, the linear prediction or the Kalman filter) may be employed. As can be understood from the above description, the analysis data X is data that includes the time series of the notes played in the period U1, and the time series of notes that are predicted to be played in the subsequent period U2 based on the time series of the notes in the period U1.

3-4. Control Data Generation Unit

The control data generation unit 23 in FIG. 2 generates control data Y for controlling the movements of the player object Ob, from the analysis data X generated by the analysis data generation unit 22. Pieces of control data Y are sequentially generated for the unit periods, respectively. Specifically, a piece of control data Y for a given unit period is generated from a piece of analysis data X for the unit period. The control data Y is generated while the performance data E is output by the performance control unit 21. That is to say, the time series of the control data Y is generated while actual performance by the player P and automatic performance by the performance device 12 are performed. As illustrated above, in the present embodiment, the same performance data E is used for the automatic performance by the performance device 12 and the generation of the control data Y. Therefore, when compared with a configuration in which different pieces of data are used for the automatic performance by the performance device 12 and the generation of the control data Y, there is the advantage in that processing for causing the object to perform movements in synchronization with the automatic performance by the performance device 12 is simplified.

Figure 5:
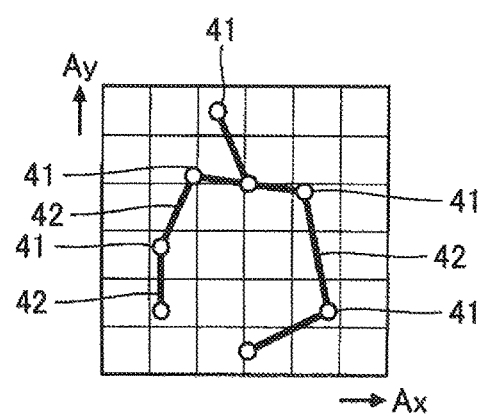
FIG. 5 is a diagram illustrating control data.

FIG. 5 is a diagram illustrating the player object Ob and the control data Y. As illustrated in FIG. 5, the skeleton of the player object Ob is represented by a plurality of control points 41 and a plurality of connecting portions 42 (links). Each control point 41 is a point that is moveable in a virtual space, and each connecting portion 42 is a straight line that connects control point 41 with each other. As can be understood from FIGS. 3 to 5, the connecting portions 42 and the control points 41 are set not only to the arms that are directly involved in the performance with a musical instrument, but also to the chest and the head that swing during the performance. The movements of the player object Ob are controlled by moving the control points 41. As described above, in the present embodiment, the control points 41 are set to the chest and the head in addition to the arms. Therefore, it is possible to enable the player object Ob to perform natural performance movements that include not only the movements of the arms playing the instrument, but also the movements of the chest and the head swinging during the performance. That is to say, it is possible to create a dramatic effect in which the player object Ob performs automatic performance as a virtual player. Note that the positions and the number of the control points 41 and the connecting portions 42 may be freely determined, and are not limited to the above example.

The control data Y generated by the control data generation unit 23 is constituted by vectors respectively representing the positions of the plurality of control points 41 in the coordinate space. As shown in FIG. 5, the control data Y according to the present embodiment represents the coordinates of each control point 41 in the two-dimensional coordinate space in which an Ax axis and an Ay axis, which are orthogonal to each other, are set. The coordinates of each control point 41 represented by the control data Y are normalized such that the average and variance of the plurality of control points 41 are respectively 0 and 1. Vectors that arrange the coordinates of a plurality of control points 41 on the Ax axis and the Ay axis are used as the control data Y. However, the control data Y may be in any format. The time series of the control data Y illustrated above represents the movements of the player object Ob (i.e. the movements of the control points 41 and the connecting portions 42 over time).

3-5. Generation of Control Data Y

Figure 6:
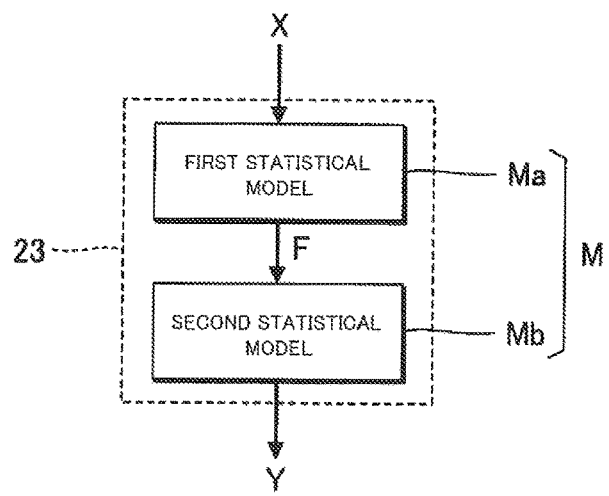
FIG. 6 is a block diagram illustrating a configuration of a control data generation unit.

As illustrated in FIG. 6, the control data generation unit 23 according to the present embodiment generates the control data Y from the analysis data X, using a trained model (machine learning model) M. The trained model M is a statistical prediction model (typically, a neural network) that has learnt the relationship between the analysis data X and the control data Y, and outputs the control data Y upon the analysis data X being input. As illustrated in FIG. 6, the trained model M according to the present embodiment is formed by connecting a first statistical model Ma and a second statistical model Mb in series.

Figure 7:
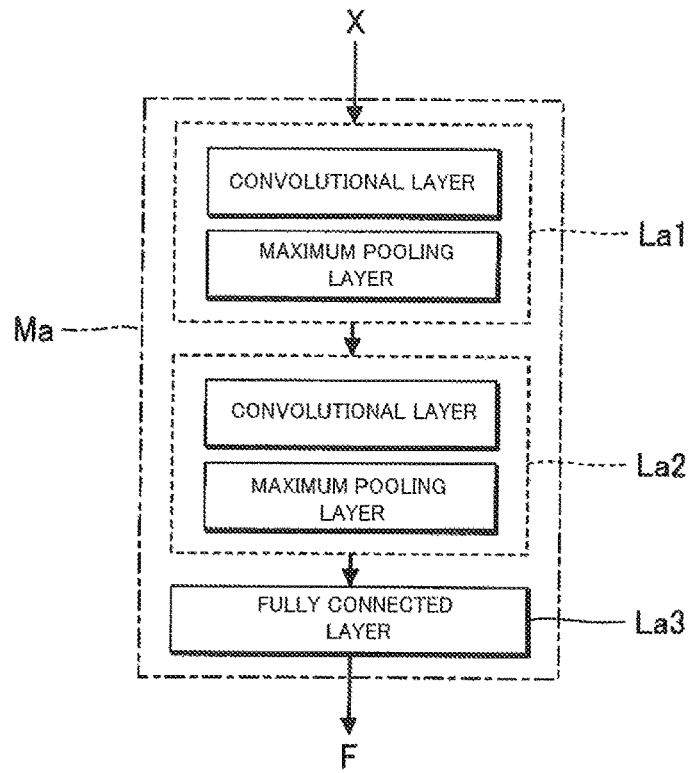
FIG. 7 is a block diagram illustrating a configuration of a first statistical model.

The first statistical model Ma takes the analysis data X as an input and generates a feature vector F that represents a feature of the analysis data X, as an output. For example, a convolutional neural network (CNN) that is suitable for feature extraction is desirably used as the first statistical model Ma. As illustrated in FIG. 7, the first statistical model Ma is formed by stacking a first layer La1, a second layer La2, and a fully connected layer La3, for example. The first layer La1 and the second layer La2 are respectively constituted by a convolutional layer and a maximum pooling layer. Thus, a feature vector F having a lower dimension than the analysis data X, which summarizes the analysis data X, is generated as an output. By generating such a feature vector F and inputting it to the second statistical model Ma described below, even if analysis data X that includes a slightly displaced note (a note of which the timing and pitch have been slightly changed) is input, for example, the above-described control points 41 can be prevented from being displaced in the control data Y that is ultimately output. That is to say, even if analysis data X that has slightly different performance data E is input, the movements of the player object Ob to be generated are prevented from being significantly changed.

Figure 8:
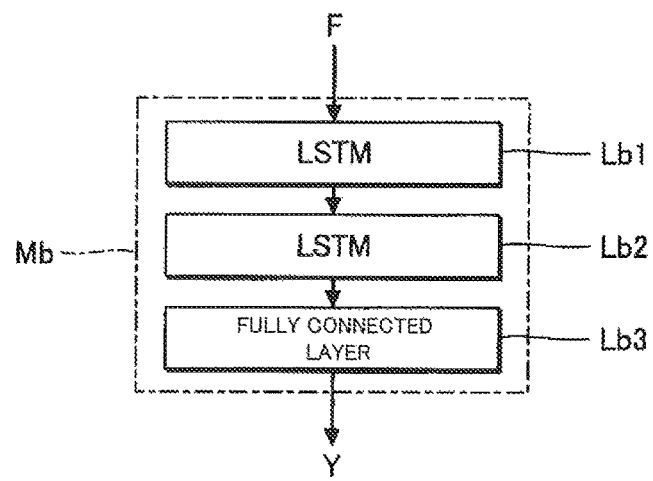
FIG. 8 is a block diagram illustrating a configuration of a second statistical model.

The second statistical model Mb generates control data Y according to the feature vector F. For example, a recurrent neural network (RNN) including a long short-term memory (LSTM) unit suitable for processing time-series data is desirably used as the second statistical model Mb. Specifically, as illustrated in FIG. 8, the second statistical model Mb is formed by stacking a first layer Lb1, a second layer Lb2, and a fully connected layer Lb3, for example. The first layer Lb1 and the second layer Lb2 are each constituted by a long short-term memory unit. Thus, when a compressed low-dimensional feature vector F is input as described above, it is possible to generate control data Y that represents smooth movements of the player object Ob.

As illustrated above, according to the present embodiment, it is possible to generate appropriate control data Y for the time series of the performance data E, using the combination of the convolutional neural network and the recurrent neural network. However, the configuration of the trained model M may be freely determined, and is not limited to the above example.

The trained model M is realized using a combination of a program that causes the control device 111 to execute computations for generating the control data Y from the analysis data X (e.g. a program module that constitutes artificial intelligence software), and a plurality of coefficients C that are applied to the computations. The plurality of coefficients C are set through machine learning (in particular deep learning) using a large number of pieces of teaching data T, and are stored in the storage device 112. Specifically, a plurality of coefficients C that define the first statistical model Ma and a plurality of coefficients C that define the second statistical model Mb are set through machine learning using a plurality of pieces of teaching data T all at once.

Figure 9:
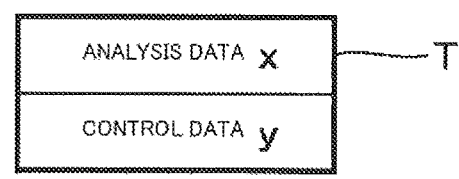
FIG. 9 is a diagram illustrating teaching data.

FIG. 9 is a diagram illustrating teaching data T. As illustrated in FIG. 9, each of a plurality of pieces of teaching data T represents a combination of analysis data x and control data y. A plurality of pieces of teaching data T for machine learning are collected by observing a scene in which a specific player (hereinafter referred to as a "sample player") actually plays the same kind of instrument as the instrument virtually played by the player object Ob. Specifically, pieces of analysis data x that represent the time series of the notes played by the sample player are sequentially generated. Also, the positions of the control points of the sample player are specified using a moving image that captures a performance by the sample player, and control data y that represents the positions of the control points is generated. Therefore, the two-dimensional coordinate space in which the above-described player object appears is generated based on the camera angle at which the image of the sample player was captured. Therefore, if the camera angle changes, the settings of the two-dimensional coordinate space also change. In this way, analysis data x and control data y generated for a point in time on the time axis are associated with each other, and thus a piece of teaching data T is generated. Note that teaching data T may be collected from a plurality of sample players.

In machine learning, a plurality of coefficients C of the trained model M are set using a backpropagation method or the like, for example, such that the loss function that represents the difference between the control data Y generated when the analysis data x of the teaching data T is input to a provisional model and the control data y of the teaching data T (i.e. the correct answer) is minimized. For example, the average absolute error between the control data Y generated by the provisional model and the control data y of the teaching data T is suitable as the loss function.

Note that the condition that the loss function is minimized does not solely guarantee that the interval between the control points 41 (i.e. the total length of each connecting portion 42) is constant. Therefore, each connecting portion 42 of the player object Ob may unnaturally expand and contract. Therefore, in the present embodiment, a plurality of coefficients C of the trained model M are optimized under the condition that a temporal change in the interval between the control points 41 represented by the control data y is minimized, in addition to the condition that the loss function is minimized. Therefore, it is possible to enable the player object Ob to perform natural movements in which the expansion and contraction of each connecting portion 42 is reduced. The trained model M generated through the above-described machine learning outputs control data Y that is statistically appropriate for unknown analysis data X, based on tendencies that are extracted from the relationship between the performance by the sample performer and the physical movements during the performance. Also, the first statistical model Ma is trained so as to extract a feature vector F that is suitable for establishing the above relationship between the analysis data X and the control data Y.

The display control unit 24 in FIG. 2 displays the player object Ob on the display device 14 according to pieces of control data Y generated by the control data generation unit 23 for unit periods respectively. Specifically, the state of the player object Ob is updated in each unit period so that the control points 41 are respectively located at the coordinates specified by the control data Y. As a result of such control being performed in each unit period, the control points 41 move over time. That is to say, the player object Ob performs performance movements. As can be understood from the above description, the time series of the control data Y defines the movements of the player object Ob.

4. Player Object Control Processing

Figure 10:
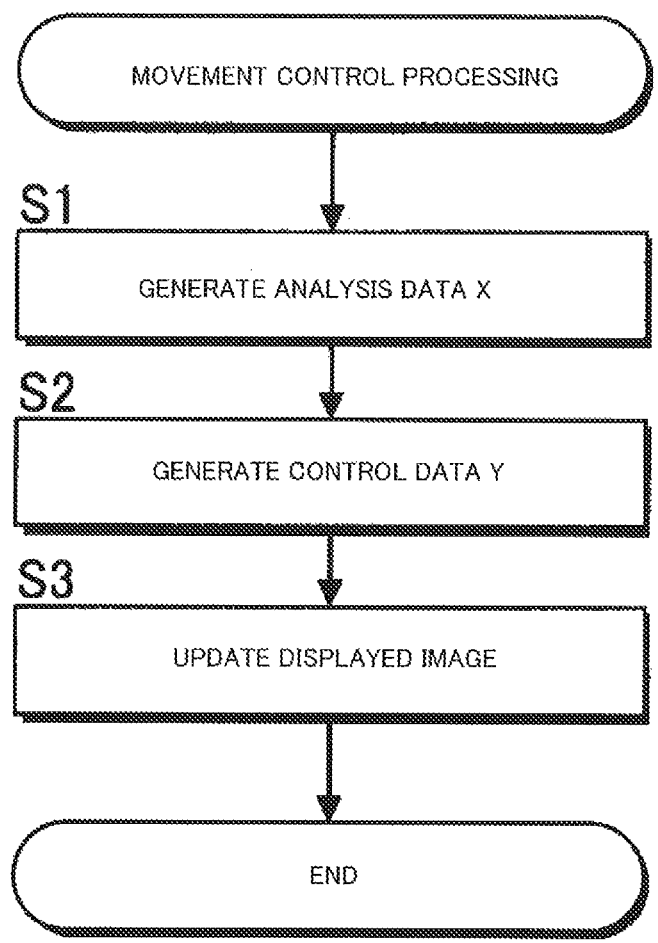
FIG. 10 is a flowchart illustrating movement control processing.

FIG. 10 is a flowchart illustrating processing that is performed to control the movements of the player object Ob (hereinafter referred to as "movement control processing"). Movement control processing is performed in each unit period on the time axis. Upon movement control processing being started, the analysis data generation unit 22 generates analysis data X that includes the time series of the notes included in the analysis period Q that includes the specific unit period U0 and the periods (U1 and U2) that are forward and rearward of the specific unit period U0 (S1). The control data generation unit 23 generates the control data Y by inputting the analysis data X, generated by the analysis data generation unit 22, to the trained model M (S2). The display control unit 24 updates the player object Ob according to the control data Y generated by the control data generation unit 23 (S3). The generation of the analysis data X (S1), the generation of the control data Y (S2), and the display of the player object Ob (S3) are performed while the performance data E is acquired.

5. Features

As described above, in the present embodiment, control data Y for controlling the movements of the player object Ob is generated from the analysis data X during the analysis period Q that includes the specific unit period U0 and the periods precedent and subsequent to the specific unit period U0, while the performance data E is acquired. That is to say, the control data Y is generated based on the performance data E regarding the performance in the period U1, which has been completed, and performance data regarding the period U2 in the future, which is predicted from the performance data E. Therefore, the movements of the player object Ob can be appropriately controlled even though the timing of causing each note in the song to sound is variable. That is to say, it is possible to control the movements of the player object Ob while responding to changes in the performance by the player P in a more reliable manner. For example, when the performance speed of the player P suddenly drops, the movements of the player object Ob corresponding to the performance speed can be instantaneously generated using the data predicted therefrom (data regarding the period U2).

In addition, when a player is to play an instrument, the player performs preparatory movements, and plays the instrument immediately after the preparatory movements. Therefore, it is impossible to generate movements of the player object that reflect such preparatory movements by simply inputting past performance data. Therefore, as described above, by inputting performance data regarding the future period as well, it is possible to generate control data Y that causes the player object Ob to perform preparatory movements.

Also, in the present embodiment, the control data Y is generated by inputting the analysis data X to the trained model M. Therefore, it is possible to generate various pieces of control data Y that are statistically appropriate for unknown analysis data X, based on tendencies that are specified using a plurality of pieces of teaching data T used in machine learning. Also, the coordinates that represent the positions of the plurality of control points 41 are normalized, and therefore, there is another advantage in that movements of the player object Ob of various sizes can be controlled using the control data Y. That is to say, in the two-dimensional coordinate space, even if the positions of the control points of a sample player in the teaching data vary, or a plurality of sample players have significantly different physique, the player object can perform average movements.

6. Modifications

Specific modifications that can be applied to the above-described embodiment will be described below. Any two or more modifications selected from those illustrated below may be combined as appropriate as long as they do not contract each other.

(1) In the above-described embodiment, a binary matrix that represents the time series of the notes included in the analysis period Q is illustrated as the performance matrix Z. However, the performance matrix Z is not limited to such an example. For example, a performance matrix Z that represents the performance strengths (volumes) of the notes included in the analysis period Q may be generated. Specifically, an element of the performance matrix Z at the $k^{th}$ row and the $n^{th}$ column represents the strength of the pitch corresponding to the $k^{th}$ row in the unit period corresponding to the $n^{th}$ column. With the above-described configuration, the control data Y reflects the respective performance strengths of notes. Therefore, tendencies in which the player moves differently depending on the magnitude of the performance strength can be added to the movements of the player object Ob.

(2) In the above-described embodiment, the feature vector F generated by the first statistical model Ma is input to the second statistical model Mb. However, another element may be added to the feature vector F generated by the first statistical model Ma, and thereafter the feature vector F may be input to the second statistical model Mb. For example, the feature vector F to which the playing position of the song played by the player P (e.g. the distance from a bar line), a performance speed, information indicating the time signature of the song, or a performance strength (e.g. a strength value or a strength sign) has been added may be input to the second statistical model Mb.

(3) In the above-described embodiment, the performance data E used to control the performance device 12 is also used to control the player object Ob. However, the control of the performance device 12 using the performance data E may be omitted. Also, the performance data E is not limited to data that conforms to the MIDI standard. For example, the frequency spectrum of the acoustic signal A output from the sound collecting device 13 may be used as the performance data E. The time series of the performance data E corresponds to the spectrogram of the acoustic signal A. The peak of the frequency spectrum of the acoustic signal A is observed in the band corresponding to the pitch of the note played by the instrument, and thus corresponds to note sound data. As can be understood from the above description, performance data E can be generally expressed as note sound data.

(4) The above-described embodiment illustrates a player object Ob that represents a player who plays a song that is the subject of automatic performance. However, the object whose movements are controlled using the control data Y is not limited to such an example. For example, an object that represents a dancer who dances in synchronization with the automatic performance by the performance device 12 may be displayed on the display device 14. Specifically, the positions of control points are specified in a moving image that captures a dancer dancing along with a song, and data that represents the positions of the control points is used as the control data y for the teaching data T. Therefore, the trained model M learns tendencies that are extracted from the relationship between the played notes and the physical movements of the dancer. As can be understood from the above description, the control data Y can be generally expressed as data for controlling movements of an object that represents a performer (e.g. a player or a dancer).

(5) The functions of the information processing device 11 according to the above-described embodiment are realized through cooperation between a computer (e.g. the control device 111) and a program. The program according to the above-described embodiment is provided in the form of being stored in a computer-readable recording medium, and is installed to a computer. The recording medium is, for example, a non-transitory recording medium, desirable examples of which include an optical recording medium (optical disc) such as a CD-ROM, and can encompass a recording medium of any known format such as a semiconductor recording medium or magnetic recording medium. Note that non-transitory recording media include any recording media excluding transitory propagating signals, and do not preclude volatile recording media. Also, the program may be provided to a computer in the form of distribution via a communication network.

(6) The subject that executes the artificial intelligence software for realizing the trained model M is not limited to a CPU. For example, a processing circuit for a neural network, such as a tensor processing unit or a neural engine, or a DSP (Digital Signal Processor) dedicated to artificial intelligence may execute the artificial intelligence software. Also, a plurality of kinds of processing circuits selected from the above examples may cooperate with each other to execute the artificial intelligence software.

(7) In the above-described embodiments, the two statistical models Ma and Mb based on machine learning are used as the trained model M of the control data generation unit 23. However, these statistical models may be realized using one model. In addition to the aforementioned neural network, a learning device formed using a support vector machine, a self-organizing map, or a learning device that performs learning by reinforcement learning may be used.

(8) In the above-described embodiment, the information processing device 11 includes the performance control unit 21, the analysis data generation unit 22, and the display control unit 24 in addition to the control data generation unit 23. However, the performance control unit 21, the analysis data generation unit 22, and the display control unit 24 are not essential for the information processing method and the information processing device according to the present invention, and they need only include the control data generation unit 23 and be able to generate the control data Y from the analysis data X. Therefore, for example, it is possible to generate the analysis data X in advance from the performance data E or the like, and generate the control data Y from the analysis data X, using the control data generation unit 23.

(9) The analysis data X may be realized in various modes. In the above-described embodiment, analysis data is used that includes the time series of the notes included in the past period U1 extracted from a portion of the performance data E and the time series of the notes included in the future period U2 predicted therefrom. However, analysis data is not limited in this way. For example, analysis data X need not include the time series of the notes included in the future period, and may be generated from a predetermined period (frame) included in the performance data E. Alternatively, it is possible to generate analysis data X that includes the times series of the notes corresponding to the entire period of the performance data E.

Supplementary Notes

For example, the following configurations can be grasped based on the embodiment illustrated above.

An information processing method according to a preferred aspect (a first aspect) of the present invention inputs analysis data that is to be processed, to a trained model that has learnt a relationship between analysis data that represents a time series of musical notes, and control data for controlling movements of an object that represents a performer, thereby generating control data according to the analysis data. According to the above-described aspect, control data is generated by inputting analysis data to a trained model. Therefore, it is possible to generate various pieces of control data that are appropriate for unknown analysis data, based on tendencies that are specified using a plurality of pieces of teaching data used in machine learning.

According to a preferred example (a second aspect) of the first aspect, the trained model includes a convolutional neural network that generates a feature vector that represents a feature of the analysis data, and a recurrent neural network that generates control data according to the feature vector, using a long short-term memory unit. According to the above-described aspect, the trained model includes a combination of a convolutional neural network and a recurrent neural network. Therefore, it is possible to generate appropriate control data according to performance data.

According to a preferred example (a third aspect) of the first aspect or the second aspect, analysis data that is used to generate control data regarding a unit period indicates a time series of musical notes included in an analysis period that includes the unit period and periods that are precedent and subsequent to the unit period. According to the above-described aspect, analysis data regarding the unit period indicates the time series of the musical notes included in the analysis period that includes the unit period and the periods that are precedent and subsequent to the unit period. Therefore, it is possible to generate control data that represents appropriate movements that reflect the past notes and the future notes relative to the unit period.

According to a preferred example (a fourth aspect) of any one of the first aspect to the third aspect, the control data represents normalized coordinates that indicate respective positions of a plurality of control points that define the object. According to the above-described aspect, the coordinates that indicate the respective positions of the plurality of control points of the object are normalized. Therefore, there is an advantage in that it is possible to control movements of objects of various sizes, using the control data.

LIST OF REFERENCE NUMERALS

100 . . . Performance System, 11 . . . Information Processing Device, 111 . . . Control Device, 112 . . .

Storage Device, 12 ... Performance Device, 121 ... Drive Mechanism, 122 ... Sounding Mechanism, 13 ... Sound Collecting Device, 14 ... Display Device, 21 ... Performance Control Unit, 22 ... Analysis Data Generation Unit, 23 ... Control Data Generation Unit, 24 ... Display Control Unit, 41 ... Control Point, 42 ... Connecting Portion, M ... Trained Model, Ma ... First Statistical Model, Mb ... Second Statistical Model.

The invention claimed is:

1. An information processing method comprising:
acquiring performance data;
generating analysis data representing a time series of musical notes included in an analysis period from the acquired performance data; and
generating control data, by inputting the generated analysis data to a trained model that has learned a relationship between teaching analysis data corresponding to the analysis data to be generated and teaching control data corresponding to the control data to be generated, for controlling movements of a virtual object representing a performer,
wherein both the analysis data and the control data are generated based on the same performance data, and
wherein the generated control data includes normalized coordinates indicating respective positions of a plurality of control points that define the virtual object.

2. The information processing method according to claim 1, wherein:
the analysis period includes:
a predetermined time;
a first period that is precedent to the predetermined time; and
a second period that is subsequent to the predetermined time, and the analysis data includes:
a first time series of musical notes included in the first period; and
a second time series of musical notes included in the second period, which are predicted from the first time series of the musical notes.

3. The information processing method according to claim 1, wherein the trained model includes:
a convolutional neural network to which the generated analysis data is input and that generates a feature vector representing a feature of the analysis data; and
a recurrent neural network that generates the control data according to the feature vector.

4. The information processing method according to claim 3, wherein the recurrent neural network includes at least one long short-term memory.

5. An information processing device comprising:
a memory storing instructions; and
a processor that implements the instructions to execute a plurality of tasks, including:
an acquiring task that acquires performance data;
an analysis data generating task that generates analysis data representing a time series of musical notes included in an analysis period from the acquired performance data; and
a control data generating task that generates control data, by inputting the generated analysis data to a trained model that has learned a relationship between teaching analysis data corresponding to the analysis data to be generated and teaching control data corresponding to the control data to be generated, for controlling movements of a virtual object representing a performer,
wherein both the analysis data and the control data are generated based on the same performance data, and
wherein the generated control data includes normalized coordinates indicating respective positions of a plurality of control points that define the virtual object.

6. The information processing device according to claim 5, wherein:
the analysis period includes:
a predetermined time;
a first period that is precedent to the predetermined time; and
a second period that is subsequent to the predetermined time, and the analysis data includes:
a first time series of musical notes included in the first period; and
a second time series of musical notes included in the second period, which are predicted from the first time series of the musical notes.

7. The information processing device according to claim 5, wherein the trained model includes:
a convolutional neural network to which the generated analysis data is input and that generates a feature vector that represents a feature of the analysis data; and
a recurrent neural network that generates the control data according to the feature vector.

8. The information processing device according to claim 7, wherein the recurrent neural network includes at least one long short-term memory.

9. A non-transitory computer-readable medium storing a program executable by a computer to execute a method comprising:
acquiring performance data;
generating analysis data representing a time series of musical notes included in an analysis period from the acquired performance data; and
generating control data, by inputting the generated analysis data to a trained model that has learned a relationship between teaching analysis data corresponding to the analysis data to be generated and teaching control data corresponding to the control data to be generated, for controlling movements of a virtual object representing a performer,
wherein both the analysis data and the control data are generated based on the same performance data, and
wherein the generated control data includes normalized coordinates indicating respective positions of a plurality of control points that define the virtual object.

* * * * *